US010377381B2

United States Patent
Schwindt

(10) Patent No.: US 10,377,381 B2
(45) Date of Patent: Aug. 13, 2019

(54) ADAPTIVE SPEED CONTROL SYSTEM FOR AN AUTONOMOUS VEHICLE

(71) Applicant: Robert Bosch GmbH, Stuttgart (DE)

(72) Inventor: Oliver Schwindt, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 309 days.

(21) Appl. No.: 15/392,496

(22) Filed: Dec. 28, 2016

(65) Prior Publication Data

US 2018/0178794 A1    Jun. 28, 2018

(51) Int. Cl.
*B60W 30/16* (2012.01)
*B60W 30/14* (2006.01)
*B60W 50/00* (2006.01)

(52) U.S. Cl.
CPC ........ *B60W 30/162* (2013.01); *B60W 30/143* (2013.01); *B60W 2050/0083* (2013.01); *B60W 2420/40* (2013.01); *B60W 2420/403* (2013.01); *B60W 2420/52* (2013.01); *B60W 2420/54* (2013.01); *B60W 2550/302* (2013.01); *B60W 2550/408* (2013.01); *B60W 2720/10* (2013.01)

(58) Field of Classification Search
CPC ............. B60W 30/162; B60W 30/143; B60W 2050/0083; B60W 2420/40; B60W 2420/403; B60W 2420/52; B60W 2420/54; B60W 2550/302; B60W 2550/408; B60W 2720/10; B60W 30/12; B60W 30/146; B60W 2420/42
USPC ...................................................... 701/96, 93
See application file for complete search history.

(56) References Cited

U.S. PATENT DOCUMENTS

| 6,026,347 | A | 2/2000 | Schuster | |
| 6,640,181 | B2* | 10/2003 | Akabori | B60K 31/0008 180/170 |
| 6,708,099 | B2* | 3/2004 | Tellis | B60K 31/0008 180/167 |
| 8,712,663 | B1 | 4/2014 | Zeng | |
| 8,831,813 | B1* | 9/2014 | Ferguson | B60T 7/042 701/23 |
| 9,096,267 | B2 | 8/2015 | Mudalige et al. | |
| 9,187,117 | B2 | 11/2015 | Spero et al. | |
| 9,428,187 | B2 | 8/2016 | Lee | |
| 2007/0005217 | A1* | 1/2007 | Nou | B60W 10/06 701/93 |
| 2012/0083987 | A1 | 4/2012 | Schwindt | |
| 2015/0355641 | A1 | 12/2015 | Choi et al. | |
| 2016/0091896 | A1 | 3/2016 | Maruyama | |

FOREIGN PATENT DOCUMENTS

| DE | 102011106808 A1 | 1/2013 |
| DE | 102013001017 A1 | 7/2014 |

* cited by examiner

*Primary Examiner* — Bao Long T Nguyen
(74) *Attorney, Agent, or Firm* — Michael Best & Friedrich LLP

(57) ABSTRACT

A method and system for operating an autonomous vehicle. The method includes determining, at an electronic processor, a limit for a forward velocity setpoint of the autonomous vehicle based a range of a forward facing sensor and detecting whether a preceding vehicle is in a field of view of the forward facing sensor. The method includes determining a speed of the preceding vehicle, and when the preceding vehicle is in the field of view of the autonomous vehicle, adjusting the limit based on the speed of the preceding vehicle.

17 Claims, 4 Drawing Sheets

ADAPTIVE SPEED CONTROL SYSTEM FOR AN AUTONOMOUS VEHICLE

FIELD

Embodiments relate to an adaptive speed control system for an autonomous vehicle.

BACKGROUND

Modern vehicles include various autonomous driving functions, for example adaptive cruise-control, collision avoidance systems, self-parking, and the like. Fully autonomous driving is a goal, but has not yet been achieved.

SUMMARY

So-called "highway pilot" systems, where a car or vehicle can drive itself in highway environments fully autonomously, are under development. Some kind of artificial intelligence is necessary to perform autonomous driving in a highway environment. Sensors that can "see" very far (i.e., sense an object a relatively long distance away from the vehicle) with a high accuracy are also required. Generally, the maximum speed that a vehicle with highway pilot can drive is limited by how far the front-mounted or forward-looking sensors can see.

The limiting factor is that the vehicle will need to be able to come to a stop for stationary vehicles or other objects that may be in or on the highway lane. It is not acceptable to perform sudden full-braking on such stationary vehicles. Among other things, sudden full-braking increases the risk of creating a rear-end collision. The host-vehicle (i.e., the vehicle with the highway pilot function or system) must be able to come to a stop using a deceleration of approximately 3 m/s$^2$. This value is not fixed, and could even be speed dependent, allowing a higher deceleration at lower speeds. Nonetheless, once the targeted deceleration for avoiding stationary objects and vehicles is decided, it is possible to calculate the maximum host-vehicle speed, given how far the front-mounted sensors can reliably see stationary objects.

Embodiments provide, among other things, a system and a method for overcoming limitations of in the distances that sensors can see (or sense).

One embodiment provides a method of operating an autonomous vehicle. The method includes determining, at an electronic processor, a limit of a forward velocity setpoint of the autonomous vehicle based on a range of a forward facing sensor and detecting whether a preceding vehicle is in a field of view of the forward facing sensor. The method includes determining a speed of the preceding vehicle, and when the preceding vehicle is in the field of view of the autonomous vehicle, adjusting the limit of the forward velocity setpoint based on the speed of the preceding vehicle.

Another embodiment provides a system for operating an autonomous vehicle. The system includes a forward facing sensor and an electronic processor communicatively connected to the forward facing sensor. The electronic processor is configured to determine a limit for a forward velocity setpoint of the autonomous vehicle based a range of a forward facing sensor, to determine whether a preceding vehicle is in a field of view of the forward facing sensor; and to determine a speed of the preceding vehicle. The electronic processor is further configured to, when the preceding vehicle is in the field of view of the autonomous vehicle, adjust the limit based on the speed of the preceding vehicle.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
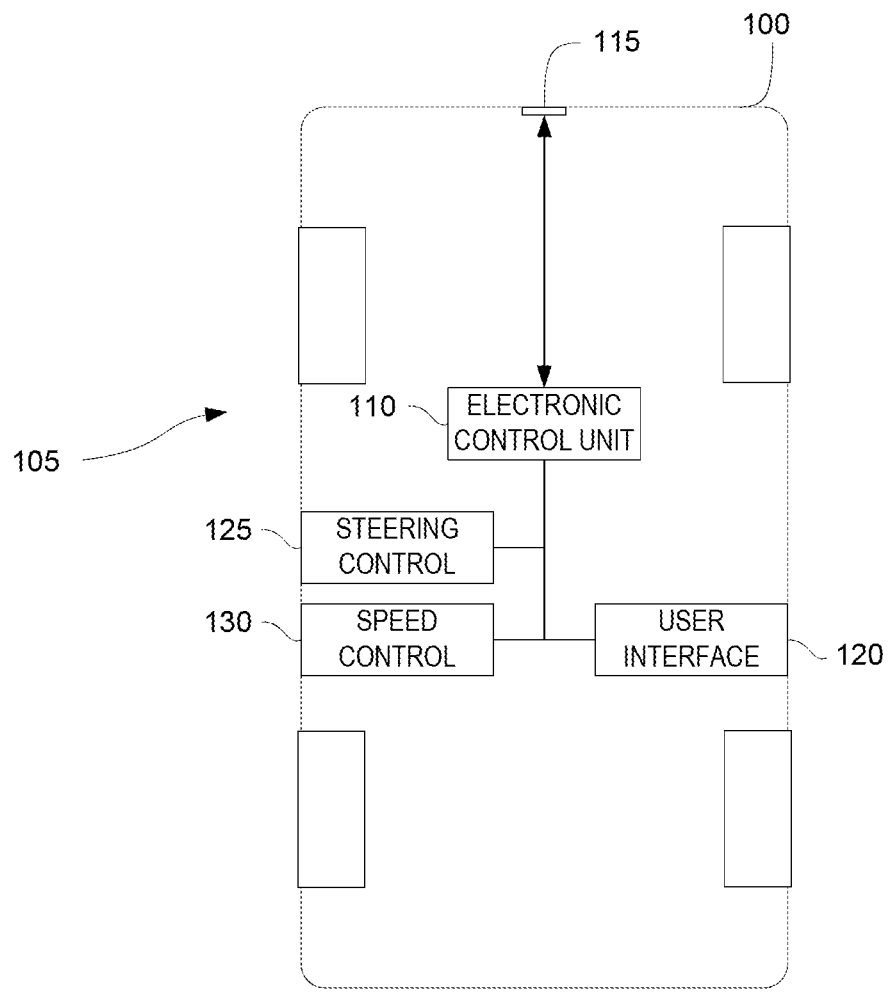
FIG. 1 is a block diagram of an autonomous vehicle equipped with an adaptive speed control system according to one embodiment.

FIG. 1 provides an illustrative example of an autonomous vehicle 100 equipped with an adaptive speed control system 105. The autonomous vehicle 100, although illustrated as a four-wheeled vehicle, may encompass various types and designs of vehicles. For example, the autonomous vehicle 100 may be an automobile, a motorcycle, a truck, a bus, a semi-tractor, and others. The autonomous vehicle 100 may not be fully autonomous but includes at least some autonomous functionality. Thus, the autonomous vehicle 100 may require a driver or operator to perform some driving functions. In the example illustrated, the adaptive speed control system 105 includes several hardware components including an electronic control unit (ECU) 110, a forward facing sensor 115, and a user interface 120. The adaptive speed control system 105 also includes a steering control 125 and a speed control 130, which although illustrated as separate components from the electronic control unit 110, may include hardware and software modules that are at least partially incorporated within the electronic control unit 110. The components of the adaptive speed control system 105 may be of various constructions and may use various communication types and protocols.

The electronic control unit 110 may be communicatively connected to the forward facing sensor 115, the user interface 120, the steering control 125, and the speed control 130 via various wired or wireless connections. For example, in some embodiments, the electronic control unit 110 is directly coupled via a dedicated wire to each of the above-listed components of the adaptive speed control system 105. In other embodiments, the electronic control unit 110 is communicatively coupled to one or more of the components via a shared communication link such as a vehicle communication bus (for example, a controller area network (CAN) bus) or a wireless vehicle network.

The forward facing sensor 115 may be implemented using multiple forward facing sensors, sensor arrays, multiple sensing components, and multiple different types of sensors. The forward facing sensor 115 may be positioned at various places on or within the autonomous vehicle 100. The forward facing sensor 115 may have a field of view that extends, at least in part, to an area including a traffic lane in the forward direction of travel and to adjacent traffic lanes. In one example, the forward facing sensor 115, or components thereof, is externally mounted to a portion of the autonomous vehicle 100 (for example, on a side mirror or front end). In another example, the forward facing sensor 115, or components thereof, is internally mounted within the autonomous vehicle 100 (for example, positioned on the dashboard or by the rearview mirror). In some embodiments, the forward facing sensor 115 includes radio detection and ranging (RADAR) functionality, light detection and ranging (LIDAR) functionality, or both. In some embodiments, the forward facing sensor 115 also includes ultrasonic ranging functionality, infrared detection functionality, or both. The forward facing sensor 115 is configured to transmit signals from the autonomous vehicle 100 and to receive reflected signals indicative of position, distance, and relative speed of other objects including other vehicles.

In yet other embodiments, the forward facing sensor 115 receives transmissions (for example, radio frequency communications) from other vehicles indicative of distance, relative speed, and location of the other vehicles rather than actively sensing these parameters. For example, in these embodiments, the forward facing sensor 115 may use vehicle-to-vehicle (V2V) communication technology to obtain some or all of these parameters. In yet other embodiments, the forward facing sensor 115 includes a camera configured to capture images and video of other vehicles. In these embodiments, various image or video processing techniques may determine distance, relative speed, location, and other parameters of the other vehicles.

In another example of the components of the adaptive speed control system 105, the steering control 125 may include a steering angle sensor, a steering actuator, and other components that directly or indirectly (for example, by differential braking) control the steering angle of the autonomous vehicle. The speed control 130 may include an electronically controlled device (for example, a throttle) and associated software for controlling power delivered to an engine of the autonomous vehicle 100. In some embodiments, the speed control 130 also includes braking controls (for example, an electronic brake controller) and braking components that, in coordination, control the braking force of the autonomous vehicle 100, and thereby control the speed of the autonomous vehicle 100.

In yet another example, the user interface 120 includes hardware and software configured to provide a human machine interface (HMI). This may include buttons, panels, dials, lights, displays, and the like, which provide input and output functionality between the electronic control unit 110 and a passenger of the autonomous vehicle 100. The user interface 120 may include one or more selectable inputs (for example, buttons or selectable icons on a display) to change modes of operation of the autonomous vehicle 100 including, for example, one or more inputs to activate and deactivate the adaptive speed control system 105 or to set a desired following distance from preceding vehicles. The user interface 120 may also include an indicator (for example, a light, an icon, an audible alarm, haptic feedback, and the like) for providing various indications to the passenger of the autonomous vehicle 100.

Each of the above-listed components of the adaptive speed control system 105 may include dedicated processing circuitry including an electronic processor and memory for receiving, processing, and transmitting data associated with the functions of each component. For example, the forward facing sensor 115 may include an electronic processor that determines the parameters relating to other vehicles discussed above. In this case, the forward facing sensor 115 transmits the parameters or calculated values associated with the parameters to the electronic control unit 110. Each of the components of the adaptive speed control system 105 may communicate with the electronic control unit 110 using various communication protocols. The embodiment illustrated in FIG. 1 provides but one example of the components and connections of the adaptive speed control system 105. However, these components and connections may be constructed in other ways than those illustrated and described herein.

Figure 2:
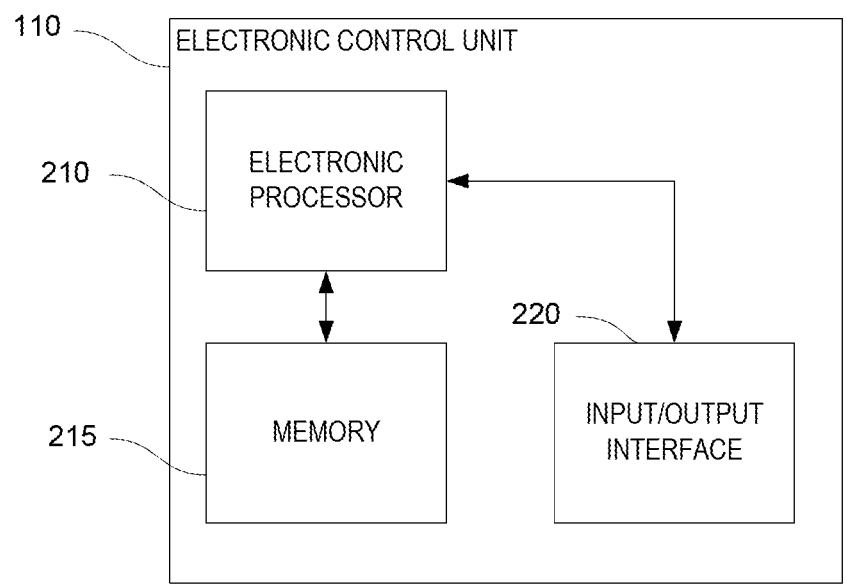
FIG. 2 is a block diagram of an electronic control unit of the adaptive speed control system of FIG. 1 according to one embodiment.

FIG. 2 is a block diagram of the electronic control unit 110 of the adaptive speed control system 105 according to one embodiment. The electronic control unit 110 includes a plurality of electrical and electronic components that provide power, operation control, and protection to the components and modules within the electronic control unit 110. The electronic control unit 110 includes, among other things, an electronic processor 205 (such as a programmable electronic microprocessor, microcontroller, or similar device), a memory 215 (for example, non-transitory, machine readable memory), and an input/output interface 220. The electronic processor 205 is communicatively connected to the memory 215 and the input/output interface 220. The electronic processor 210, in coordination with the memory 215 and the input/output interface 220, is configured to implement, among other things, the methods described herein.

Figure 3:
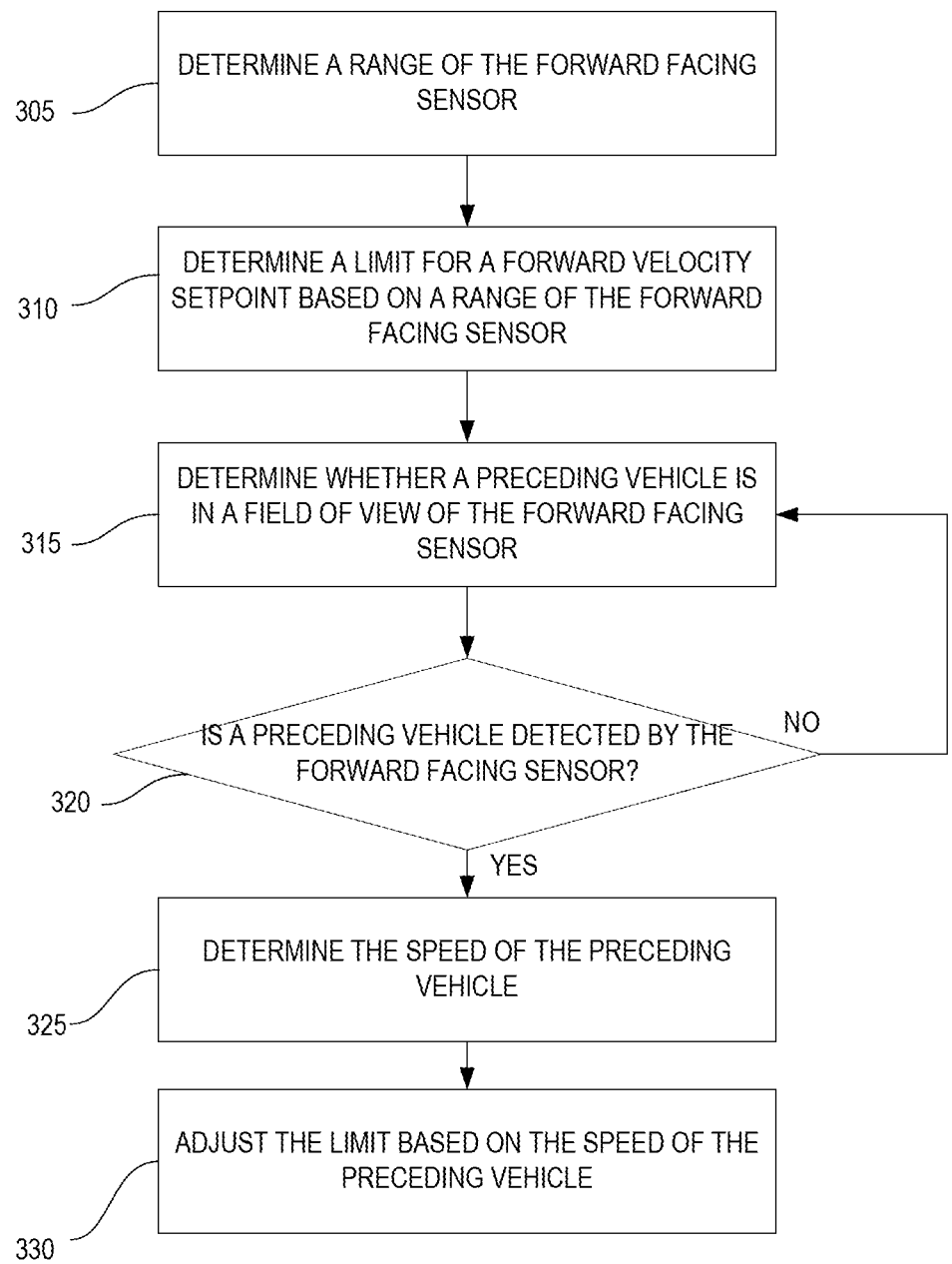
FIG. 3 is a flowchart of a method of operating the adaptive speed control system of FIG. 1 according to one embodiment.

The electronic control unit 110 may be implemented in several independent controllers (for example, programmable electronic control units) each configured to perform specific functions or sub-functions. Additionally, the electronic control unit 110 may contain sub-modules that include additional electronic processors, memory, or application specific integrated circuits (ASICs) for handling input/output functions, processing of signals, and application of the methods listed below. In other embodiments, the electronic control unit 110 includes additional, fewer, or different components FIG. 3 illustrates a method of operating the autonomous vehicle 100 with the adaptive speed control system 105 according to one embodiment. In the illustrated method, the electronic processor 210 determines a range of the forward facing sensor 115 (block 305). In some embodiments, the range of the forward facing sensor 115 is predetermined based on the type of sensor that is installed on the autonomous vehicle 100 and stored as a parameter in the memory 215. In other embodiments, the range of the forward facing sensor 115 may be determined, by the electronic processor 210 or logic within the forward facing sensor 115, as driving conditions change. For example, the range of the forward facing sensor 115 may be updated based on weather conditions, time of day, and other factors that may affect the field of view of the forward facing sensor 115.

The electronic processor 210 determines the limit for the forward velocity setpoint based on the range of the forward facing sensor 115 (block 310). The forward velocity setpoint is value of the currently desired speed of the autonomous vehicle 100 that may be set or adjusted based on a current driving state, current driving maneuver, posted speed limit, type of road segment, and others. In this way, the forward velocity setpoint is the target speed of the autonomous vehicle 100. The limit for the forward velocity setpoint is a value that sets an upper limit to the forward velocity setpoint. In other words, the limit is a value of speed that the electronic processor 210 will not exceed when setting the forward velocity setpoint. The limit is typically reached, for example, when the autonomous vehicle 100 is travelling on a highway.

In some embodiments, the limit may also be initially determined (prior to adjusting the limit as described below) based at least in part on the stopping distance of the autonomous vehicle 100. For example, the stopping distance at multiple speeds of the autonomous vehicle 100 may be predetermined and stored in the memory 215 (for example, in a lookup table). The electronic processor 210 may then initially set the limit to a value of speed that allows the autonomous vehicle 100 to come to a complete stop when a stationary object is detected by the forward facing sensor 115. In some cases, the limit is set based on a maximum desirable deceleration value that is less than deceleration under full braking. For example, the limit may be set to a value that allows the autonomous vehicle 100 to perform a complete stop at a deceleration of 3 m/s$^2$ when a stationary object is detected by the forward facing sensor 115. However, the autonomous vehicle 100 may decelerate faster than 3 m/s$^2$ to react to sudden events such as other vehicles braking. In some embodiments, the desirable deceleration value may be speed dependent. In some embodiments, the following equation is used to determine the initial limit:

$$\text{Maximum limit} = \sqrt{2 \times \text{desirable deceleration} \times \text{Range of forward facing sensor}}$$

The electronic processor 210 determines whether a preceding vehicle (for example, a vehicle that is travelling in front of and in the same direction of the autonomous vehicle 100) is in a field of view of the forward facing sensor 115 (block 315). This may include determining whether the preceding vehicle is travelling in a common traffic lane as the autonomous vehicle or travelling in an adjacent traffic lane to the autonomous vehicle 100. When no preceding vehicle is detected by the forward facing sensor 115, the electronic processor 210 continues to try to search for preceding vehicles with the forward facing sensor 115, and uses the initial limit for the forward velocity setpoint (block 320).

Conversely, when the electronic processor 210 determines that there is a preceding vehicle detected by the forward facing sensor 115, the electronic processor 210 (or the forward facing sensor 115) determines the speed of the preceding vehicle (block 325). This may include determining a relative speed between the autonomous vehicle 100 and the preceding vehicle, and then calculating the speed of the preceding vehicle relative to the ground based on the speed of the autonomous vehicle 100.

The electronic processor 210 then adjusts the limit based on the speed of the preceding vehicle. In particular, the electronic processor 210 adjusts the initial limit as discussed above with the adjusted limit and stores the adjusted limit in memory 215. In some embodiments, the electronic processor 210 may continuously adjust the limit as the speed of the preceding vehicle changes. As described in the method below, the electronic processor 210 may adjust the limit in multiple ways. When a preceding vehicle is present and after adjusting the limit based on the speed of the preceding vehicle, the limit is no longer based on the range of the forward facing sensor 115. The electronic processor 210, after adjusting the limit, may maintain the limit until the preceding vehicle is no longer detected by the forward facing sensor 115.

Figure 4:
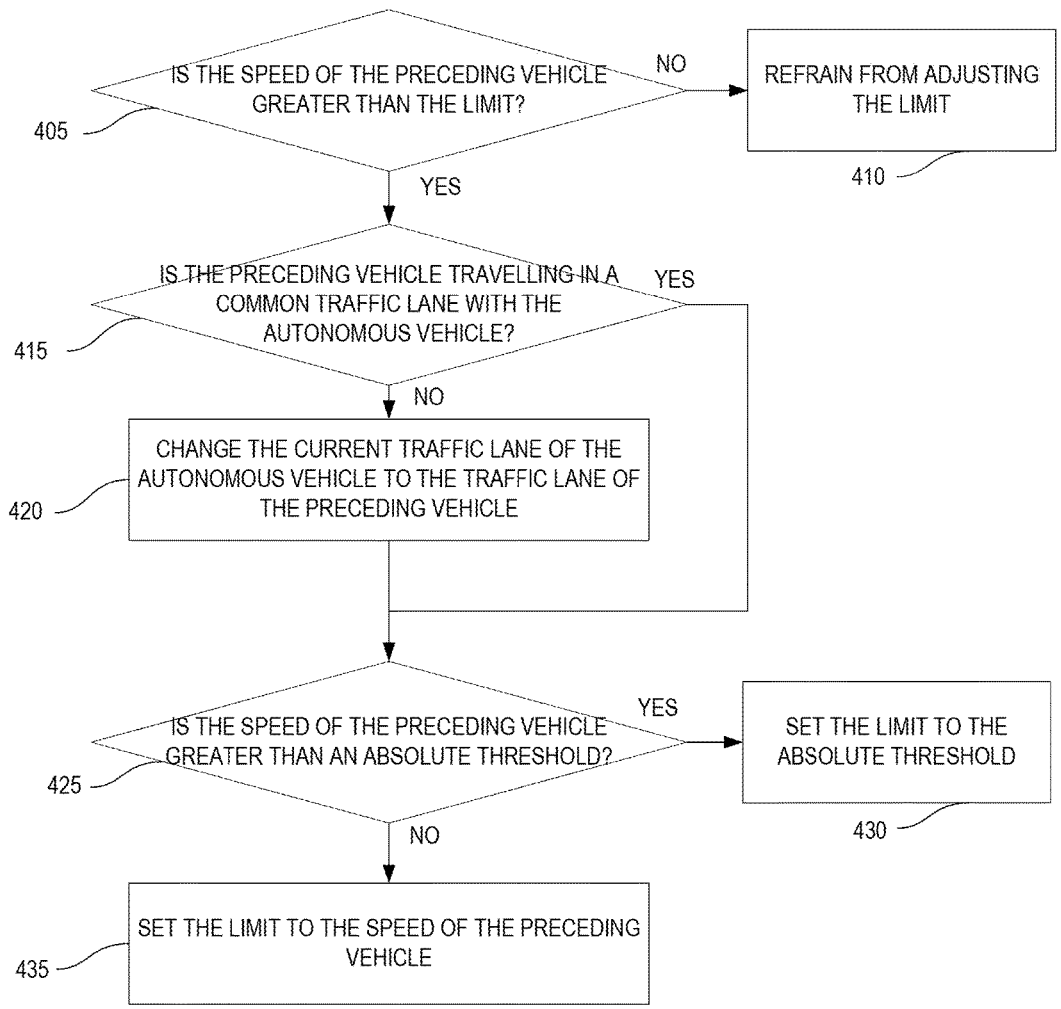
FIG. 4 is a flowchart of a method of operating the adaptive speed control system of FIG. 1 according to another embodiment.

FIG. 4 illustrates a method of operating the adaptive speed control system 105 according to another embodiment. In the example provided, FIG. 4 illustrates a method for adjusting the limit for the forward velocity setpoint based on the speed of the preceding vehicle as listed in block 303 of FIG. 3. As discussed above, the limit for the forward velocity setpoint may be previously set based on the range of the forward-facing sensor 115. In the illustrated method, the electronic processor 210 determines if the speed of the preceding vehicle is greater than the limit (block 405). When the speed of the preceding vehicle is not greater than the limit, the electronic processor 210 refrains from adjusting the limit (block 410). The electronic processor 210 also determines whether the preceding vehicle is travelling in a common traffic lane with the autonomous vehicle 100 (block 415). When the preceding vehicle is traveling in a common traffic lane, no lane adjustment is necessary, and the autonomous vehicle 100 continues its current path. However, when the preceding vehicle is not travelling in a common traffic lane, in some embodiments, the electronic processor 210 initiates a lane change to the current traffic lane of the preceding vehicle (block 420). In other words, the electronic processor 210 performs an automated lane change and begins following the preceding vehicle.

When there are multiple preceding vehicles (for example, in multiple traffic lanes), the electronic processor 210 may select one of the preceding vehicles to follow. For example, if one of the multiple preceding vehicles is in a common traffic lane (block 415) and is travelling greater than the limit (block 405), then the electronic processor 210 may continue to follow this preceding vehicle. In another example, if one of the multiple preceding vehicles is in a common traffic lane, but is travelling at less than the limit, then the electronic processor 210 may follow the closest or, in some embodiments, the fastest moving preceding vehicle that is travelling greater than the limit.

When the lane change is complete, the autonomous vehicle 100 follows the preceding vehicle as long as the path of travel of the preceding vehicle is the same as the autonomous vehicle 100 or as long as the preceding vehicle maintains a speed greater than the limit. For, example, if the preceding vehicle exits the highway or turns in a direction that is not in the planned route of travel for the autonomous vehicle, the electronic processor 210 ceases to the follow the preceding vehicle and ceases to adjust the limit based on the preceding vehicle. In some embodiments, when the electronic processor 210 determines that another preceding vehicle is more beneficial to follow, such as when another preceding vehicle is travelling at a faster rate, the electronic processor 210 changes lanes to follow the other preceding vehicle.

In some embodiments, the electronic processor 210 also determines whether the speed of the preceding vehicle is greater than an absolute threshold (block 425). For example, the electronic processor 210 may limit adjustment of the limit to a value not exceeding the absolute threshold. As a consequence, the absolute threshold defines the maximum allowable speed of the autonomous vehicle 100 at any given time. When the speed of the preceding vehicle is greater than the absolute threshold, the electronic processor 210 may set the limit to a value equal to the maximum threshold (block 430). If the preceding vehicle then moves out of range of the forward facing sensor 115, the electronic processor 210 may reset the limit to the initially determined or default limit. When the speed of the preceding vehicle is less than the absolute threshold, the electronic processor 210 may set the limit to the speed of the preceding vehicle (block 435).

As a consequence, the autonomous vehicle 100 adjusts the limit by increasing the limit when the preceding vehicle is travelling faster than the autonomous vehicle 100, and thus enables faster travel than would be possible when a preceding vehicle is not present. In effect, this increases the maximum allowable speed of the autonomous vehicle beyond the speed limitations that are imposed by range limitations of the forward facing sensor 115.

Various features, advantages, and embodiments are set forth in the following claims.

What is claimed is:

1. A method of operating an autonomous vehicle, the method comprising:
   determining, at an electronic processor, a limit for a forward velocity setpoint of the autonomous vehicle based a range of a forward facing sensor;
   determining a stopping distance of the autonomous vehicle;
   detecting whether a preceding vehicle is in a field of view of the forward facing sensor;
   determining a speed of the preceding vehicle;
   setting the limit to a value based on the stopping distance of the autonomous vehicle and the range of the forward facing sensor; and
   when the preceding vehicle is in the field of view of the autonomous vehicle adjusting the limit based on the speed of the preceding vehicle.

2. The method according to claim 1, wherein adjusting the limit includes increasing the limit when the speed of the preceding vehicle is greater than the limit.

3. The method according to claim 1, wherein adjusting the limit includes setting the limit equal to the speed of the preceding vehicle when the speed of the preceding vehicle is greater than the limit.

4. The method according to claim 1, wherein adjusting the limit includes refraining from adjusting the limit when the speed of the preceding vehicle is less than the limit.

5. The method according to claim 1, wherein after adjusting the limit based on the speed of the preceding vehicle, the limit is no longer based on the range of the forward facing sensor.

6. The method according to claim 1, wherein detecting whether a preceding vehicle is in a field of view of the forward facing sensor includes determining whether the preceding vehicle is travelling in a traffic lane in common with the autonomous vehicle.

7. The method according to claim 6, the method further comprising after adjusting the limit, maintaining the limit until the preceding vehicle is no longer detected by the forward facing sensor.

8. The method according to claim 6, the method further comprising when the preceding vehicle is not travelling in a common traffic lane with the autonomous vehicle, automatically changing lanes to a common traffic lane prior to adjusting the limit.

9. An adaptive speed control system for an autonomous vehicle, the system comprising:
   a forward facing sensor; and
   an electronic processor communicatively connected to the forward facing sensor, the electronic processor configured to
      determine a limit for a forward velocity setpoint of the autonomous vehicle based on a range of a forward facing sensor;
      determine whether a preceding vehicle is in a field of view of the forward facing sensor;
      determine a speed of the preceding vehicle; and
      when the preceding vehicle is in the field of view of the autonomous vehicle, adjust the limit based on the speed of the preceding vehicle, the limit being no longer based on the range of the forward facing sensor.

10. The adaptive speed control system according to claim 9, wherein the electronic processor is further configured to increase the limit when the speed of the preceding vehicle is greater than the limit.

11. The adaptive speed control system according to claim 9, wherein the electronic processor is further configured to set the limit equal to the speed of the preceding vehicle when the speed of the preceding vehicle is greater than the limit.

12. The adaptive speed control system according to claim 9, wherein the electronic processor is further configured to refrain from adjusting the limit when the speed of the preceding vehicle is less than the limit.

13. The adaptive speed control system according to claim 9, wherein the electronic processor is further configured to determine a stopping distance of the autonomous vehicle, and a range of the forward facing sensor.

14. The adaptive speed control system according to claim 13, wherein the electronic processor is further configured to, prior to adjusting the limit, set the limit to a value based on the stopping distance of the autonomous vehicle and the range of the forward facing sensor.

15. The adaptive speed control system according to claim 9, wherein the electronic processor is further configured to determine whether the preceding vehicle is travelling in a traffic lane in common with the autonomous vehicle.

16. The adaptive speed control system according to claim 15, wherein the electronic processor is further configured to, after adjusting the limit, maintain the limit until the preceding vehicle is no longer detected by the forward facing sensor.

17. The adaptive speed control system according to claim 15, wherein the electronic processor is further configured to, when the preceding vehicle is not travelling in a common traffic lane with the autonomous vehicle, automatically changing lanes to a common traffic lane prior to adjusting the limit.

* * * * *